(12) United States Patent
Wass et al.

(10) Patent No.: US 12,473,986 B2
(45) Date of Patent: Nov. 18, 2025

(54) VALVE FOR BATTERY

(71) Applicant: Stark Future, S.L., Sitges (ES)

(72) Inventors: Anton Wass, Sitges (ES); Paul Soucy, Sitges (ES)

(73) Assignee: Stark Future, S.L., Sitges (ES)

( * ) Notice: Subject to any disclaimer, the term of this patent is extended or adjusted under 35 U.S.C. 154(b) by 552 days.

(21) Appl. No.: 17/903,275

(22) Filed: Sep. 6, 2022

(65) Prior Publication Data

US 2023/0187768 A1 Jun. 15, 2023

(30) Foreign Application Priority Data

Dec. 10, 2021 (ES) .............................. ES202132431U

(51) Int. Cl.
    *F16K 15/02* (2006.01)
(52) U.S. Cl.
    CPC .................................. *F16K 15/026* (2013.01)
(58) Field of Classification Search
    CPC .... F16K 15/025; F16K 15/026; F16K 15/028; F16K 15/065; F16K 24/04; F16K 24/06
    See application file for complete search history.

(56) References Cited

U.S. PATENT DOCUMENTS

| 5,971,016 A * | 10/1999 | Wass .................... F16K 17/0413 |
| | | 137/542 |
| 11,306,839 B1 * | 4/2022 | Anderson ............. F16K 15/028 |
| 11,566,717 B2 * | 1/2023 | Hicks ...................... F16K 15/06 |

FOREIGN PATENT DOCUMENTS

DE 3344339 C2 * 6/1991

OTHER PUBLICATIONS

Machine English translation of DE3344339 (Year: 2025).*

* cited by examiner

*Primary Examiner* — Hailey K. Do
(74) *Attorney, Agent, or Firm* — MaxGoLaw PLLC

(57) ABSTRACT

A valve for a battery is provided to expel the air in case of overpressure generated in a battery includes from an external body (2) and a plunger (3) that travels inside it pushed by the battery pressure. The valve presents two opening positions and is coupled to a plunger (3), at least: —a first O-ring (5) that closes the passage of the air when there is no pressure and opens it when the plunger (3) moves at a first position from a given degree of pressure, —a second O-ring (6) that prevents the direct exit outside of the air when there is only a first degree of pressure and allows it when the degree of pressure is exceeded that opens the plunger (3) at second position, and—a ventilation element (4) that allows the passage of the air through it, but not the passage of the water.

8 Claims, 2 Drawing Sheets

VALVE FOR BATTERY

OBJECT OF THE INVENTION

The invention, as stated in the title of this specification, refers to a valve for battery contributing, to the function to which it is designed, with advantages and characteristics that are disclosed in detail thereafter The object of this invention falls on a valve for electric batteries having as objective to expel the eventual overpressure charge generated inside it by the heat of the cells, with the particularity that it is designed with a structure providing two levels of opening depending on the level of pressure generated.

FIELD OF APPLICATION OF THE INVENTION

The field of application of this invention is within the sector of the industry engaged in manufacturing batteries, including at the same time the manufacture of pressure valves.

BACKGROUND OF THE INVENTION

As it is known, the electric batteries, in particular those constituted by a plurality of cells incorporated within an airtight casing, can present an overpressure generated by an excess of increase of the heat produced by the said cells, which, if a safety valve does not exist, could give rise to an eventual risk of explosion and, at least, of the battery deterioration and malfunction.

The objective of this invention, therefore, is to develop a valve to avoid the said situation and to relieve the overpressure which, in addition, allows to condition the said relief at the level of the pressure produced, so that it is in relation to it.

On the other hand, and as reference to the current state-of-the-art, although the existence of a safety valve for batteries is known, at least the applicant is not aware of the existence of any having technical and structural characteristics same or similar to those of the one herein claimed.

EXPLANATION OF THE INVENTION

The valve for battery that the invention proposes is configured as an improved alternative to what is already known, suitable as solution to the above-mentioned objective, the characterizing details making it possible and that distinguish it conveniently appearing in the final claims attached to this description.

Concretely, what the invention proposes, as it was said above, is a valve for batteries, in particular electric batteries of those constituted by a plurality of cells housed within an airtight casing, that has as objective to serve as a safety element to expel an eventual overpressure charge generated within because of the heat of the said cells, which presents the advantageous particularity that it is designed with a structure providing two levels of opening adapted to act depending on the level of pressure generated, so that, from a given level of pressure, the valve opens in a first position and, from a second level of pressure, the valve opens in a second position, with which the valve opening degree, instead of being always the same, is adapted to the needs of pressure discharge depending on the pressure degree it is required to relieve.

For this, and more specifically, the valve object of the invention comprises, conventionally, a cylindric external body within which a plunger is traveling between a closed position and an open position, that closes and opens the passage of the air between both sides of the external body, a proximal side being installed so that it remains contacting the inside of the battery casing and the opposite or distal side remains open outwards.

From the said already known configuration, the valve of the invention is essentially distinguished in that the said plunger, that is formed by a stem and a hollow head, the stem being inserted in a central hole of the wall that separates the proximal side of the external body from the distal side of the said body where the head remains located, it possesses a first O-ring, incorporated in the area of junction between the stem and the plunger head and with a second O-ring, incorporated at the distal end of the said plunger head, perimetrically incorporated to a ventilation element or Gore® vent-type valve, that closes the open end of the plunger head which, in turn, presents several perimetric perforations.

Thus, when the valve is in rest position, because there is no excess of pressure, the first plunger seal fits in the hole of the wall where the stem is inserted and closes the passage of the air through it from one side to the other of the valve external body.

When a given value of pressure is exceeded within the battery, the pressure pushes the plunger displacing the stem and the first O-ring from its fitting in the hole to the distal side of the external body, leaving that the air passes towards the said distal side of the external body, where a first chamber is created by the adjustment of the second O-ring with the internal wall of the external body at this side of it so that the air, that cannot directly exit outside, penetrates in the plunger head through the perimetric perforations provided in it and, from inside the said head that defines a second chamber or intermediate chamber, exit to the exterior through the ventilation element, that prevents the entrance of water but allows the exit of the air. The ventilation element is preferably a Gore® vent valve.

It shall be pointed out that this Gore® vent—type ventilation element, is manufactured of a material consisting in a fabric that allows the exit of the air but prevents the entrance of water, because the water within the battery is very dangerous. However, this type of fabric does not avoid the entrance of humidity.

This configuration is interesting because, while the first degree of pressure is not exceeded, the ventilation element does not act and therefore the airflow between inside and outside the battery is not possible nor the entrance of the outside humidity towards the inside of the battery. Said otherwise, this configuration limits the time of the ventilation element opening that prevents the entrance of water but allows the exit of air.

When, inside the battery, a second degree of pressure is exceeded, the plunger travels even more towards the distal side of the external body, so that the second O-ring reaches an area having lateral holes close to the end of the distal side of the said external body, with which it allows that the air, in addition to be able to exit from the intermediate chamber that the plunger head defines through the above-described ventilation element, it also allows that it is directly expelled outside from the first chamber through the said lateral holes, so that the relief of the pressure is higher to be able to absorb the higher degree thereof within the battery. This higher ventilation is interesting to avoid the explosion of the battery provoked by an overpressure due to thermal runaway that is when the cell temperature rises so much that it is not possible to reduce it and the cells starts to burn by itself. This quick rise of the temperature provokes a quick rise of the pressure that can provoke the exposure of the battery if the overpressure generated is not quickly released.

Last, it shall be pointed out that, preferably, the valve is designed in order that:
- with a pressure under 0.1 bar, the plunger does not move and the passage of the air remains closed;
- with a pressure from 0.1 bar to 0.7 bar, the plunger only travels to a first opening position; and
- with a pressure over 0.7 bar, the plunger travels to a second opening position.

DESCRIPTION OF THE DRAWINGS

To complement the description being carried out and in order to assist to best understanding the characteristics of the invention, attached to this specification, as an integral part thereof, there is a set of drawings in which, for illustration and no limitation purpose, the following has been represented.

PREFERRED EMBODIMENT OF THE INVENTION

Figure 1:
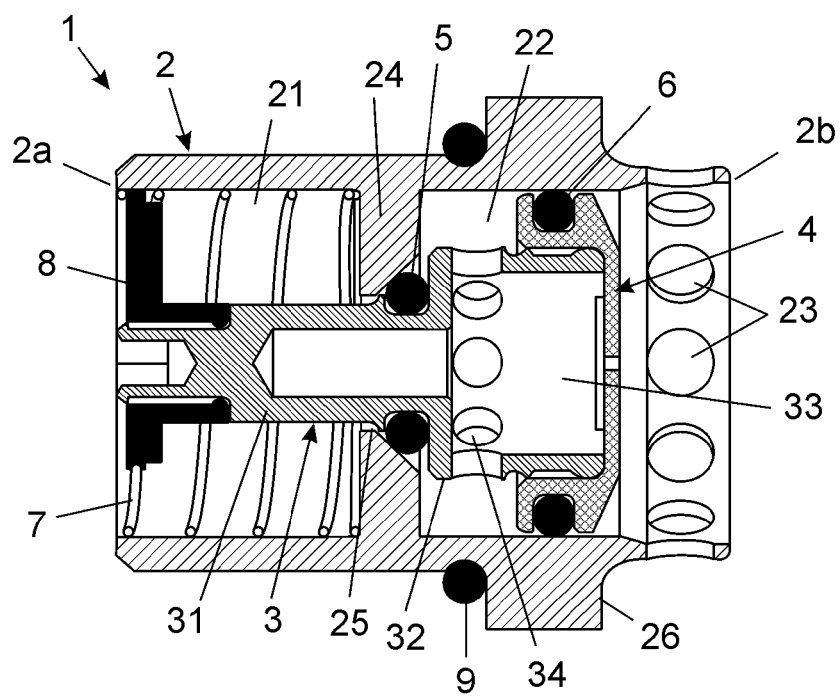
FIG. 1—It shows a schematic sectional view of an example of embodiment of the valve for battery object of the invention, which has been represented in closed or rest position, the parts and elements it comprises can be seen.

Seen the said figures, and according to the numerals adopted, a non-limiting example of embodiment of the battery valve of the invention can be seen in them, which comprises what is described in detail thereafter.

Thus, as it can be seen in the said figures, the valve (1) of the invention applicable for its implementation in the casing of a cell battery (not shown), as a safety means to relieve an eventual excess of pressure provoked by the heat of the cells within the said casing, comprises:
- a cylindric external body (2), that in turn comprises:
- at a proximal side (2a), a housing (21) open inside the battery casing
- at a distal side (2b), an external chamber (22) outwardly open that possesses, at its end, a series of lateral holes (23), and
- between both sides, a dividing wall (24) having a central hole (25);
- and an internal plunger (3) that slides between both sides of the external body (2) and that, in turn, comprises:
- a stem (31) inserted in the central hole (25) of the dividing wall (24), remaining oriented towards the housing (21) of the proximal side (2a),
- a head (32) having a larger diameter than the stem (31) that remains located in the external chamber (22) of the distal side (2b) and that is hollow inside, defining a second chamber or intermediate chamber (33) that presents a series of perimetric perforations (34);
- a ventilation element (4), concretely a Gore® vent-type valve, that closes the plunger (3) head (32) end allowing the passage of the air through it, but not the humidity,
- a first O-ring (5), incorporated in the plunger (3), in the area of junction between the stem (31) and the head (32) adapted to fit and seal the central hole (25) of the wall (24) where the plunger (3) stem (31) is inserted, and
- a second O-ring (6) that, incorporated perimetrically to the stem (3) head (32), is fitted on the internal wall of the external body (2) chamber (22).

Figure 2:
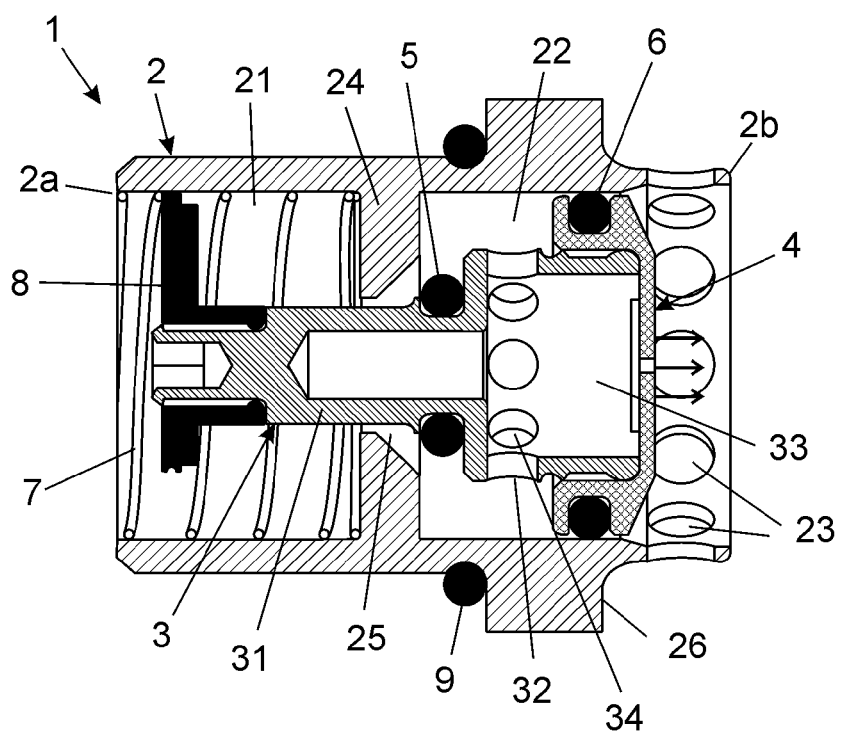
FIG. 2—It shows a view of the valve of the invention similar to that shown in the FIG. 1, in this case represented in a first opening position, which is reached when a given value of pressure is exceeded.
Figure 3:
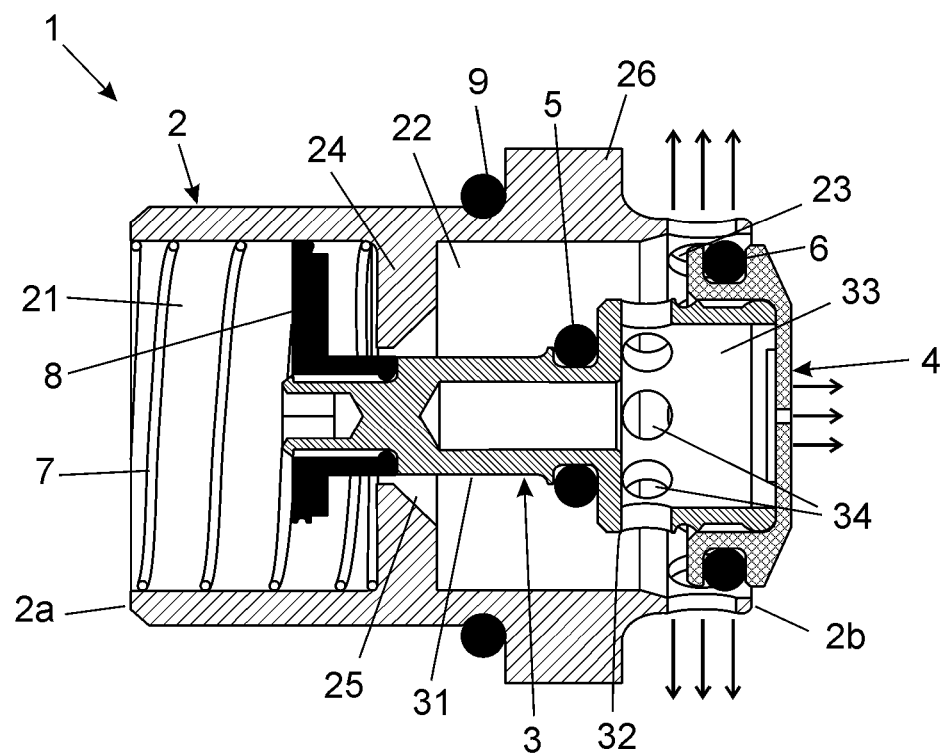
FIG. 3—It shows a sectional view of the valve, similar to that of the preceding figures, in this case represented at a second opening position, which is reached when a second degree of pressure is exceeded.

With all that, the operation of the valve is so that:
- When there is no pressure in the battery, preferably under 0.1 bar, the plunger (3) is located at a closed position (FIG. 1), so that the first O-ring (5) seals the central hole (25) where the stem (31) is inserted, preventing the passage of the air from the battery to outside.
- When there is a given degree of pressure in the battery, preferably between 0.1 and 0.7 bar, the said pressure pushes the plunger (3) towards the distal side (2b) of the external body (2) so that the first O-ring (5) is separated from the central hole (25) in which it is fitted, allowing the passage of the air through the said central hole (25) from the housing (21) of the proximal side (2a) towards the external chamber (22) where it remains retained by the adjustment of the second O-ring (6) on the walls thereof and it penetrates in the intermediate chamber (33) that the plunger (3) head (32) defines through the perforations (34) thereof, exiting outside through the ventilation element (4), as it is shown in the FIG. 2.
- And, when there is a higher pressure within the battery, preferably over 0.7 bar, the plunger (3) is moved even more towards the distal side (2b) of the external body (2) until the second O-ring (6) remains coinciding with the lateral holes (23) of the external chamber (22) allowing that the air, in addition to continue exiting through the ventilation element (4), exits directly outside through the said lateral holes (23), as it is shown in the FIG. 3.

Preferably, to secure the fixation of the ventilation element (4), the second O-ring (6) is incorporated in a perimetric notch of the said element that fit on the plunger (3) head (32) end so that, at same time, the sealing effect of this second O-ring (8) is secured on the internal walls of the external chamber (22).

Preferably, the central hole (25) of the dividing wall (24) of the external body (2) presents a conical configuration that opens towards the external chamber (22) with the aim of providing space for the adjustment of the first O-ring (5) thereof.

Preferably, in the housing (21) of the proximal side (2a) of the external body (2) a spring (7) is provided that allows the adjustment of the assembly to a connector (not shown) arranged in the casing of the battery to that effect.

Likewise, at the end of the plunger (3) stem (31) that remains oriented towards the battery there is the incorporation of a stop (8) that prevents that the said stem (31) passes through the central hole (25) beyond a given point and the plunger goes out of its place.

On the other hand, in a preferred embodiment, the valve comprises in addition a third O-ring (9) situated externally to the external body (2) close to a perimetric thickening (26) thereof provided for its coupling in the said battery connector.

Summarizing, therefore, the valve (1) object of the invention, applicable to expel the air in case of overpressure generated in a battery because of its cells heating, is distinguished in that it presents two opening positions depending on the level of pressure generated for which, being formed from an external body (2) and a plunger (3) that travels inside it pushed by the pressure of the battery, comprises, coupled to the said plunger (3), at least:
- a first O-ring (5) that closes the passage of the air when there is no pressure and opens it when the plunger (3) moves at a first position from a given degree of pressure,
- a second O-ring (6) that prevents the direct exit outside of the air when there is only a first degree of pressure and allows it when the said degree of pressure is exceeded that opens the plunger (3) at second position, and
- a ventilation element (4) that, in both opening positions allows the passage of the air through it, but not the passage of the humidity.

Sufficiently disclosed the nature of this invention, as well as the manner of implementing it, it is not deemed necessary to extend anymore its explanation in order that any person skilled in the art understands its extends and the advantages arising from it.

The invention claimed is:

1. A valve for a battery to expel air in case of overpressure generated in the battery because of cells of the battery are heating, the valve comprising:
    an external body (2) and a plunger (3) that travels inside the external body (2) pushed by pressure in the battery, wherein the external body presents two opening positions, depending on a level of the pressure generated, by means of coupling to the plunger (3), at least:
    a first O-ring (5) that closes the passage of the air when there is no pressure and opens it when the plunger (3) moves to a first position from the pressure,
    a second O-ring (6) that prevents the direct exit of the air outside when there is only a first degree of the pressure and allows the air to exit when the pressure exceeds a threshold to be the overpressure that opens the plunger (3) to second position, and
    a ventilation element (4) that allows the passage of the air through the ventilation element (4), but not the passage of the humidity therethrough, wherein
the ventilation element (4) only acts when the pressure is the overpressure, allowing in this situation the exit of the overpressure through the ventilation element (4) and, therefore, preventing the entrance of humidity through the ventilation element (4) while the pressure is not exceeded and so that when the overpressure exists, there exists a direct communication through the ventilation element (4) between an inside of the battery and an outside of the battery allowing thus a quick release of the overpressure.

2. The valve according to the claim 1, characterized in that when the pressure is under 0.1 bar, the plunger (3) does not move and the passage of the air remains closed; when the pressure is 0.1 bar to 0.7 bar, the plunger (3) travels to a first opening position; and when the overpressure is over 0.7 bar, the plunger travels to a second opening position.

3. The valve according to the claim 1,
    the external body (2) comprising:
    at a proximal side (2a), a housing (21) open inside a battery casing,
    at a distal side (2b) of the external body (2), an external chamber (22) outwardly open that possesses, a series of lateral holes (23) on an end of the external chamber (22),
    between both sides of the external body (2), a dividing wall (24) having a central hole (25);
    and an internal plunger (3) that slides between both sides of the external body (2), wherein the plunger comprises:
    a stem (31) inserted in the central hole (25) of the dividing wall (24), remaining oriented towards the housing (21) of the proximal side (2a),
    a head (32) having a larger diameter than the stem (31) that remains located in the external chamber (22) of the distal side (2b) and that is hollow inside, defining a second chamber or intermediate chamber (33) that presents a series of perimetric perforations (34);
    the ventilation element (4), that closes a plunger (3) head (32) end;
    the first O-ring (5), incorporated in the plunger (3), in the area of junction between the stem (31) and the head (32) adapted to fit and seal the central hole (25) of the wall (24) where the stem (31) is inserted, and
    the second O-ring (6) that, incorporated perimetrically to the stem (3) head (32), is fitted on an internal wall of the external chamber (22), wherein
    when there is no pressure in the battery, the plunger (3) is located at a closed position and the first O-ring (5) seals the central hole (25) where the stem (31) is inserted, preventing the passage of the air from the battery to outside,
    when there is the pressure in the battery, the pressure pushes the plunger (3) towards the distal side (2b) of the external body (2) the first O-ring (5) being separated from the central hole (25) allowing the passage of the air towards the external chamber (22) where it remains retained by the second O-ring (6) and the plunger penetrates in the intermediate chamber (33) through the perforations (34) thereof, exiting outside through the ventilation element (4),
    and, when there is the overpressure within the battery, the plunger (3) is moved even more towards the second O-ring (6) remains coinciding with the lateral holes (23) of the external chamber (22) allowing the air to, in addition to exiting through the ventilation element (4), exit directly outside.

4. The valve according to the claim 3, characterized in that the central hole (25) of the dividing wall (24) of the external body (2) presents a conical configuration that opens towards the external chamber (22) providing space for the adjustment of the first O-ring (5) thereof.

5. The valve according to the claim 3, characterized in that in the housing (21) of the proximal side (2a) of the external body (2) a spring (7) is provided that allows the adjustment of an assembly to a connector provided to that effect in the battery casing.

6. The valve according to the claim 3, characterized in that at the end of the stem (31) there is a stop (8) that prevents that the said stem (31) passing through the central hole (25) beyond a given point.

7. The valve according to the claim 3, characterized in that the second O-ring (6) is incorporated in a perimetric notch of the ventilation element (4) that fits on the plunger head end.

8. The valve according to the claim 7, characterized in that the central hole (25) of the dividing wall (24) of the external body (2) presents a conical configuration that opens towards the external chamber (22) providing space for the adjustment of the first O-ring (5) thereof.

* * * * *